United States Patent
Guido et al.

(10) Patent No.: US 10,203,060 B2
(45) Date of Patent: Feb. 12, 2019

(54) AFTER THE MASS-SPRING PRINCIPLE OPERATING VIBRATION ABSORBER

(71) Applicants: Hans-Jurgen Guido, Neutraubling (DE); Jürgen Ernst, Atting (DE)

(72) Inventors: Hans-Jurgen Guido, Neutraubling (DE); Jürgen Ernst, Atting (DE)

(73) Assignee: Hans-Jurgen Guido, Neutraubling (DE)

( * ) Notice: Subject to any disclaimer, the term of this patent is extended or adjusted under 35 U.S.C. 154(b) by 422 days.

(21) Appl. No.: 14/603,967

(22) Filed: Jan. 23, 2015

(65) Prior Publication Data
US 2015/0204474 A1 Jul. 23, 2015

(30) Foreign Application Priority Data

Jan. 23, 2014 (DE) .................. 10 2014 100 781

(51) Int. Cl.
*F16L 55/02* (2006.01)
*F02M 55/04* (2006.01)
(Continued)

(52) U.S. Cl.
CPC .............. *F16L 55/02* (2013.01); *F02M 55/02* (2013.01); *F02M 55/04* (2013.01); *F02M 61/14* (2013.01);
(Continued)

(58) Field of Classification Search
CPC .... F02M 55/02; F02M 55/04; F02M 2200/09; F02M 2200/8023; F02M 2200/8053;
(Continued)

(56) References Cited

U.S. PATENT DOCUMENTS 2,355,742 A * 8/1944 Morehouse ........... F16L 3/2235
174/40 CC
2,761,714 A * 9/1956 Cuskie ............... B60G 21/0551
248/74.1
(Continued)

FOREIGN PATENT DOCUMENTS

CN 2375909 Y * 4/2000
CN 202660144 U 1/2013
(Continued)

OTHER PUBLICATIONS

Communication dated Jun. 15, 2015, from the European Patent Office in counterpart application No. 15152041.8.
(Continued)

*Primary Examiner* — John Zaleskas
(74) *Attorney, Agent, or Firm* — Sughrue Mion, PLLC (57) ABSTRACT

A vibration damper (1) operating in accordance with the mass-spring principle, which is provided for fitting on an injection line pipe, includes a main body (2) which comprises an elastomeric vibration-damping material and has an inside hollow space (3) which passes therethrough in the longitudinal direction and which in the fitted condition surrounds the injection line pipe, the longitudinal axis (4) of the inside hollow space (3) coinciding with the longitudinal axis of the pipe, and is characterized in that it has a mass distribution eccentric with respect to its longitudinal axis (4) and can be non-rotatably fitted on the injection line pipe.

13 Claims, 5 Drawing Sheets

(51) Int. Cl.
*F02M 61/14* (2006.01)
*F16F 7/108* (2006.01)
*F02M 55/02* (2006.01)
*F16L 55/033* (2006.01)

(52) U.S. Cl.
CPC .......... *F16F 7/108* (2013.01); *F16L 55/0335* (2013.01); *F02M 2200/09* (2013.01); *F02M 2200/8023* (2013.01); *F02M 2200/8053* (2013.01); *F02M 2200/8061* (2013.01); *F02M 2200/9015* (2013.01)

(58) Field of Classification Search
CPC .... F02M 2200/8061; F02M 2200/9015; F16L 55/02; F16L 55/0335; F16L 3/08; F16L 15/02; F16L 15/04; F16L 57/00; F16L 3/13; F16F 7/108; F16F 7/116; F16F 7/10; F16F 7/104; F16F 7/1028
USPC .... 123/198 R, 468, 469; 188/378, 379, 380; 248/74.1, 74.2
See application file for complete search history.

(56) References Cited

U.S. PATENT DOCUMENTS

| | | | | |
|---|---|---|---|---|
| 3,073,887 A * | 1/1963 | McGavern | ............ | F16F 7/108 174/42 |
| 3,172,502 A * | 3/1965 | Welis | ................ | F16L 55/0335 138/103 |
| 3,370,815 A * | 2/1968 | Opperthauser | .......... | F16L 3/13 138/106 |
| 3,606,218 A * | 9/1971 | Enlund et al. | ........ | F16L 55/035 248/74.2 |
| 4,043,506 A * | 8/1977 | Guido | ................... | F02M 55/02 239/76 |
| 4,185,802 A | 1/1980 | Myles et al. | | |
| 4,614,321 A * | 9/1986 | Andre | ................. | F16B 5/0685 24/555 |
| 4,669,156 A * | 6/1987 | Guido | ................... | F16L 3/2235 24/297 |
| 4,840,333 A * | 6/1989 | Nakayama | ............... | F16B 5/12 248/68.1 |
| 4,934,635 A * | 6/1990 | Sherman | ................... | F16L 3/10 24/279 |
| 4,997,148 A * | 3/1991 | Sherman | ................... | F16L 3/10 24/279 |
| 5,013,002 A * | 5/1991 | Lefferts | ..................... | F16L 3/12 248/635 |
| 5,160,105 A * | 11/1992 | Miller | ................... | A47C 7/002 248/188.9 |
| 5,257,768 A * | 11/1993 | Juenemann | ........... | F16L 55/035 248/604 |
| 5,984,243 A * | 11/1999 | Pfaller | ................. | F16L 3/1066 248/74.1 |
| 6,126,119 A * | 10/2000 | Giangrasso | .......... | F16L 59/135 248/58 |
| 6,152,406 A * | 11/2000 | Denndou | ................ | F16L 3/221 248/68.1 |
| 6,308,921 B1 * | 10/2001 | Borzucki | ................ | F16L 3/237 248/68.1 |
| 6,601,802 B1 * | 8/2003 | Howe | ....................... | F16L 3/14 248/58 |
| 6,682,025 B2 * | 1/2004 | Turner | ................... | F16L 3/1041 248/49 |
| 7,614,589 B2 * | 11/2009 | Kato | ........................ | F16L 3/223 248/55 |
| 7,806,213 B2 * | 10/2010 | Inoue | .................. | F02M 37/0017 180/69.4 |
| 8,356,778 B2 * | 1/2013 | Birli | ........................ | F16L 3/127 248/65 |
| 8,662,457 B2 | 3/2014 | Sampson | | |
| 2005/0005982 A1 * | 1/2005 | Muscat | ................. | F16L 55/041 138/26 |
| 2005/0264004 A1 * | 12/2005 | Kim | .................... | F16L 55/0335 285/124.5 |
| 2007/0246614 A1 * | 10/2007 | Allmann | ............... | F16L 3/2235 248/65 |
| 2008/0017761 A1 * | 1/2008 | Hashimoto | ........... | F16L 3/2235 248/68.1 |
| 2009/0200104 A1 * | 8/2009 | Baum | ................. | F16L 55/0335 181/233 |
| 2010/0219301 A1 | 9/2010 | Sampson | | |
| 2010/0243855 A1 | 9/2010 | Sampson | | |
| 2011/0260011 A1 * | 10/2011 | Yu | ......................... | F16L 3/2235 248/75 |
| 2013/0112518 A1 * | 5/2013 | Kim | ..................... | F16F 7/108 188/379 |
| 2013/0214100 A1 * | 8/2013 | Edmond | ................. | F16L 3/227 248/74.4 |
| 2014/0001000 A1 | 1/2014 | Sinadinos et al. | | |
| 2014/0299722 A1 * | 10/2014 | Sampson | ............. | F16L 3/1058 248/74.2 |

FOREIGN PATENT DOCUMENTS

| | | | | |
|---|---|---|---|---|
| DE | 2020677 A1 * | 11/1971 | ............. | F02M 55/02 |
| DE | 2303634 | 7/1973 | | |
| DE | 3025601 A1 * | 1/1982 | ............ | F16L 55/035 |
| DE | 3028998 A1 | 3/1982 | | |
| DE | 69401402 T2 | 6/1997 | | |
| EP | 0230553 A1 * | 8/1987 | ............. | F16L 3/2235 |
| EP | 1847746 A1 | 10/2007 | | |
| EP | 2072801 A1 | 6/2009 | | |
| FR | 2548279 A1 * | 1/1985 | ............. | F02M 55/02 |
| FR | 2710381 A1 * | 3/1995 | ........ | B60G 21/0551 |
| GB | 700117 A * | 11/1953 | ............. | F02M 55/02 |
| JP | 161452 U | 4/1989 | | |
| JP | WO 0147737 A1 * | 7/2001 | ............. | B60K 13/04 |
| JP | 2002130077 A * | 5/2002 | ............. | F02M 55/02 |
| JP | 2002349386 A * | 12/2002 | | |
| JP | 2011183998 A * | 9/2011 | | |
| JP | 2012225476 A | 11/2012 | | |
| KR | 200303233 Y1 * | 2/2003 | | |
| WO | WO 2008064970 A1 * | 6/2008 | ............. | F02M 55/02 |

OTHER PUBLICATIONS

Communication dated Jan. 13, 2015, issued by the German Patent Office in counterpart Application No. 102014100781.6.
Communication dated Jan. 12, 2018, from German Patent and Trademark Office in counterpart application No. 10 2014 100 781.6.

* cited by examiner

AFTER THE MASS-SPRING PRINCIPLE OPERATING VIBRATION ABSORBER

The invention concerns a vibration damper operating in accordance with the mass-spring principle, of the kind set forth in the classifying portion of claim 1.

Such vibration dampers which in the technical literature are also referred to as resonance dampers, vibration isolators, resonance absorbers, tuned mass dampers or mass-spring damper systems are used inter alia on injection lines, in particular of diesel engines. An essential characteristic of such vibration dampers is that they are only connected to the component, the vibrations of which are to be damped, but they do not serve for fixing and/or connecting said component to any other bodies.

Modern injection systems operate with ever increasingly fast injectors and a plurality of injection processes per engine revolution and cylinder at ever increasing injection pressures. The hydraulic pressure shocks in the injection lines, caused by the opening and closing processes of the injectors, thereby become ever increasingly more intensive and reach ever increasingly high frequencies.

As a consequence of that the injection lines can be more and more frequently excited at one of their natural frequencies to produce resonance vibrations whereby there is the risk that failure occurs of the injection line due to fracture thereof.

That problem can be avoided by fitting a rubber or rubber-metal vibration damper to the injection line.

Known rubber-metal vibration dampers are of a hollow-cylindrical shape, the diameter of the inside hollow space being approximately equal to the outside diameter of the injection line on which the vibration damper is to be mounted.

The action of the known vibration dampers is based on the mass-spring system with damping. The vibration damper is in a position to efficiently suppress resonance frequencies of the injection line as long as they are above the natural frequency of the vibration damper by the factor of $\sqrt{2}$ (square root of 2).

To be able to effectively damp a frequency band which is as wide as possible the vibration damper must have a natural frequency which is as low as possible. For that purpose the known vibration dampers must be of a comparatively high weight and as thick-walled as possible. A shaped rubber member which has those properties in order to be suitable as a vibration damper is however disadvantageous in regard to costs and the required structural space on the engine.

In comparison the object of the invention is to develop a vibration damper of the kind set forth in the opening part of this specification in such a way that, with the same damping effectiveness, it can be of a markedly lower weight, a smaller volume and a smaller wall thickness than the known vibration dampers.

To attain that object the invention provides the features recited in claim 1.

The eccentric configuration of the vibration dampers according to the invention provides that they perform rotational vibrations about the pipe axis of the injection line, which do not occur in the case of the rotationally symmetrical vibration dampers of the state of the art. In terms of their natural frequency the rotational vibrations produced according to the invention are markedly lower than the vibrations of the known vibration dampers. According to the invention it is possible to achieve a factor of 5, which makes it possible to reduce the weight of the vibration damper by the factor of 25, at the same fundamental frequency.

The eccentric mass distribution of a vibration damper according to the invention is preferably achieved in that the main body which in itself is in the shape of a hollow circular cylinder is connected to at least one additional eccentric mass which can extend in the axial direction over the entire height of the main body or only a part of that height.

That at least one eccentric mass can be formed in one piece with the main body or can be in the form of a separate component non-rotatably fixed thereto.

In the first-mentioned case the main body and the eccentric mass can comprise the same material. As an alternative thereto however in both cases it is also possible for the main body to comprise an elastomeric, vibration-damping material while for example the eccentric mass is formed by a metal body which is fitted from the exterior or which is eccentrically embedded into the material of the main body.

It is essential that the center of mass of the vibration damper is not disposed on the longitudinal axis of the inside hollow space of the vibration damper, which axis coincides in the mounted condition with the axis of the injection line pipe, but is arranged displaced relative thereto radially outwardly. The radial line which connects the longitudinal axis of the inside hollow space of the vibration damper to the center of mass of the eccentric mass is identified in the present context as the eccentricity axis.

As a vibration damper which has only one eccentric mass can damp only movements perpendicularly to the corresponding eccentricity axis with rotational vibrations it is necessary for at least two such vibration dampers to be non-rotatably mounted in axial succession on an injection line pipe whose vibrations are to be effectively damped in such a way that the eccentricity axes thereof include with each other an angle differing both from 0° and also from 180°, preferably an angle of 90°.

To reduce the fitment complication and expenditure it is preferably provided that a vibration damper is equipped with at least two eccentric masses fixed to the main body either in one piece or in the form of additional elements in such a way that their eccentricity axes include with each other the above-mentioned angle with respect to the longitudinal axis.

These and further advantageous configurations of a vibration damper according to the invention are recited in the appendant claims.

The invention is described hereinafter by means of embodiments by way of example with reference to the drawing in which.

In all the Figures parts which are the same or which correspond to each other are denoted by the same references.

Figure 1:
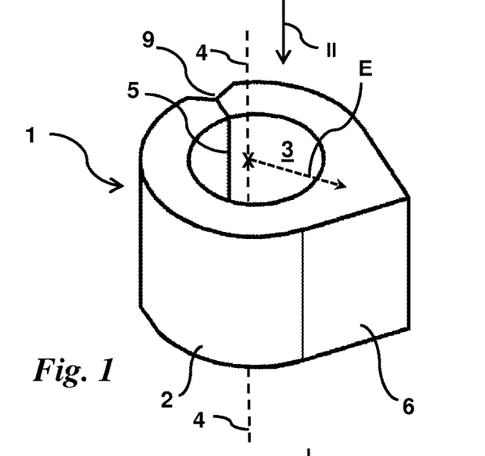
FIG. 1 shows a perspective view of a first embodiment of a vibration damper according to the invention with a prismatic eccentric portion.

FIG. 1 with 4 and 7 with 10 show vibration dampers according to the invention, each of which has a hollow-cylindrical main body 2 with an inside hollow space 3 which extends therethrough and the inside diameter of which is matched to the outside diameter of the injection line pipe (not shown) on which the vibration damper 1 is to be non-rotatably mounted, for example by means of an adhesive join or by frictionally locking engagement, in such a way that the longitudinal axis 4 of the inside hollow space 3 coincides with the longitudinal axis of the injection line pipe. To improve the frictionally locking engagement even with a disadvantageous tolerance situation, it can be provided that the inside surface of the inside hollow space 3 is of a roughened or toothed nature, as is described in greater detail hereinafter with reference to FIGS. 19 through 25.

The vibration dampers shown in FIGS. 5 and 6 and FIGS. 11 and 12 also have an inside hollow space 3 of circular cross-section, which is configured in the same manner and which serves the same purpose, but the main bodies 2 thereof in a cross-section perpendicular to the longitudinal axis 4 are of an approximately square outside contour with rounded corners.

In order to be able to push the respective vibration damper 1 on to an injection line pipe perpendicularly to the longitudinal axis 4 the outside wall of the main body 2 is cut along a surface line 5 over the entire height so that the main body 2 can be spread open at that line 5 in order to permit the injection line pipe to pass through the resulting opening into the inside hollow space 3 in the vibration damper 1. To facilitate spreading the main body 2 open there can be provided a notch 9 (not shown in FIGS. 5, 6 and 11, 12) which extends over the entire axial length of the main body 2 and which is approximately V-shaped in cross-section and which extends inwardly in the radial direction starting from the outside surface of the main body 2 over a part of its wall thickness and ends with its tip at the section line 5.

Figure 2:
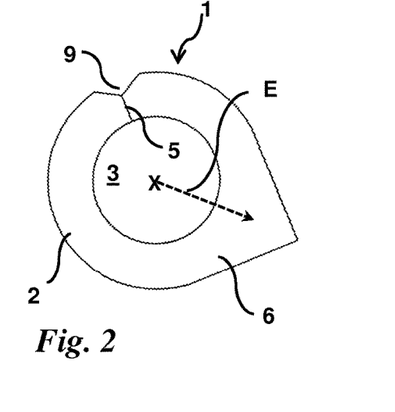
FIG. 2 shows a plan view of the vibration damper of FIG. 1 in the direction of the arrow II.

In the embodiment shown in FIGS. 1 and 2 the eccentric mass is formed by a prismatic eccentric portion 6 which is formed in one piece on the main body 2 of the vibration damper 1 and extends over the entire axial height or length of the main body and which in the plan view in FIG. 2 is of an approximately triangular outside contour.

The eccentricity axis E indicates that the line of the center of gravity of the entire vibration damper 1, which line is parallel to the longitudinal axis 4, is displaced outwardly in the radial direction by that eccentric portion 6.

Figure 3:
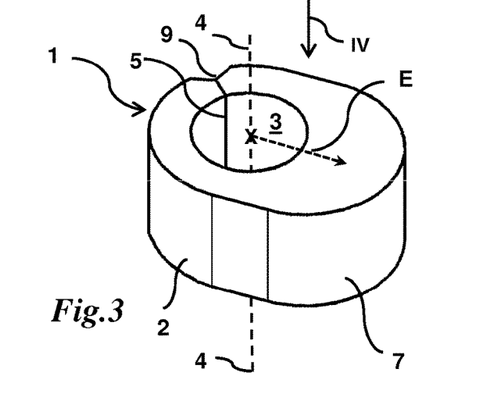
FIG. 3 shows a perspective view of a second embodiment of a vibration damper according to the invention with a semi-cylindrical eccentric portion.
Figure 4:
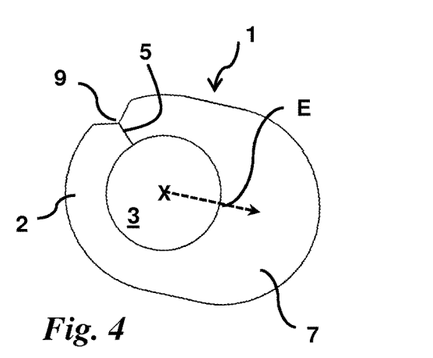
FIG. 4 shows a plan view of the vibration damper of FIG. 3 in the direction of the arrow IV.

FIGS. 3 and 4 show a vibration damper 1 which is of substantially the same structure as the vibration damper of FIGS. 1 and 2 and which differs therefrom only in that its eccentric portion 7 in the plan view in FIG. 4 is of a semicircular outside contour, wherein the center point of that semicircle is displaced outwardly in the radial direction relative to the longitudinal axis 3.

Figure 5:
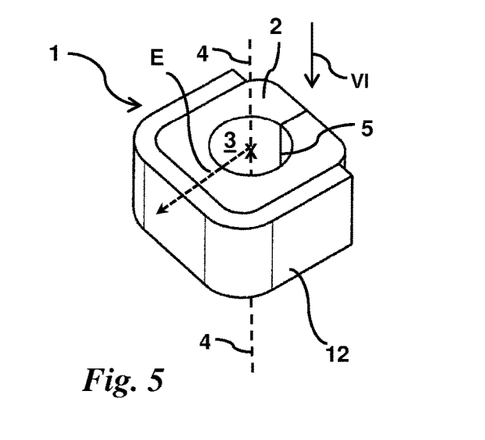
FIG. 5 shows a perspective view of a third embodiment of a vibration damper according to the invention with a fitted-on additional element.
Figure 6:
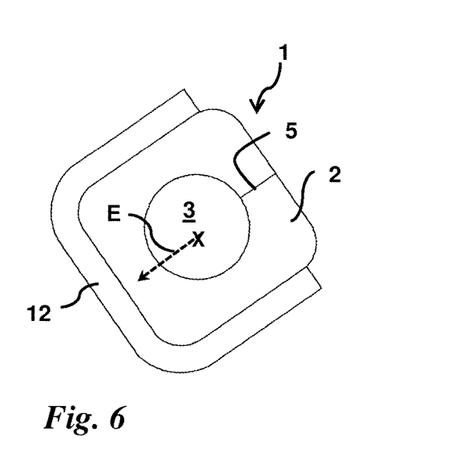
FIG. 6 shows a plan view of the vibration damper of FIG. 5 in the direction of the arrow VI.

The vibration damper 1 shown in FIGS. 5 and 6, in the plan view in the direction in FIG. 6, is of a cross-section with a substantially square outside contour, with the corners being rounded off. In this case also the main body 2 is cut along a surface line, as indicated by the section line 5. The notch 9 is here admittedly not shown, for the sake of clarity, but it can be provided in the same manner as in the case of the vibration dampers of FIGS. 1 through 4.

The eccentric mass is formed here by an additional element 12 so that it can be of the same axial length as the main body 2 and can be fitted thereon in such a way that it embraces three of its sides in an approximately C-shaped configuration. That additional element 12 can comprise another, in particular heavier, material than the main body 2 of the vibration damper 1 in order to achieve an enhanced damping action.

As the vibration dampers described hitherto only damp movements perpendicularly to the respective eccentricity axis E with rotational vibrations, it is necessary for at least two such vibration dampers to be non-rotatably fixed to one and the same injection line in such a way that their eccentricity axes preferably include with each other an angle of 90° so that the vibrations thereof are damped in the same fashion in all directions perpendicularly to the axis of the pipe.

To simplify fitment each of the vibration dampers shown in FIGS. 7 through 10 respectively includes two eccentric masses which are so oriented that their eccentricity axes E, E' include an angle with each other of 90°.

Figure 7:
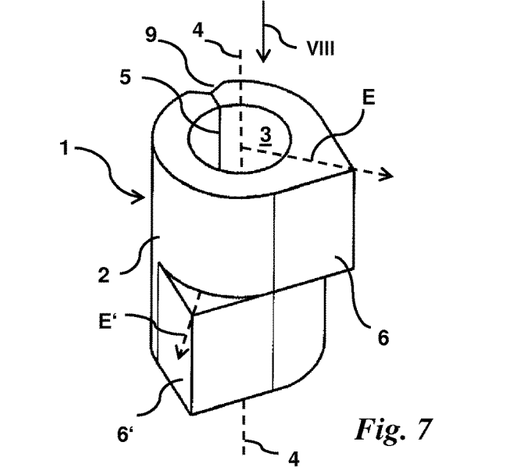
FIG. 7 shows a perspective view of a fourth embodiment of a vibration damper according to the invention with two prismatic eccentric portions.
Figure 8:
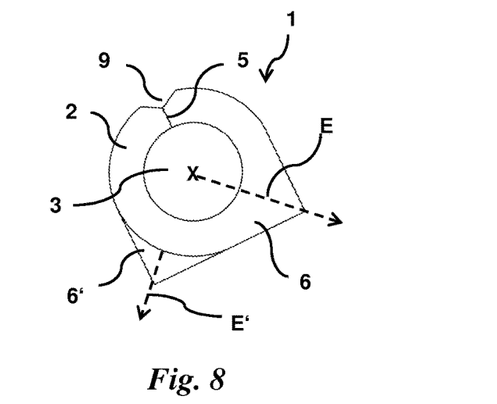
FIG. 8 shows a plan view of the vibration damper of FIG. 7 in the direction of the arrow VIII.

In the embodiment in FIGS. 7 and 8 the eccentric masses are formed by two eccentric portions 6, 6' which are formed in one piece on the main body 2 and which immediately adjoin each other in the axial direction and are of the same shape as the eccentric portion in FIGS. 1 and 2.

Figure 9:
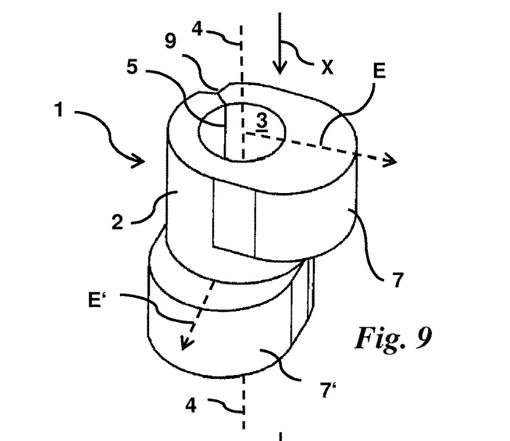
FIG. 9 shows a perspective view of a fifth embodiment of a vibration damper according to the invention with two semi-cylindrical eccentric portions.
Figure 10:
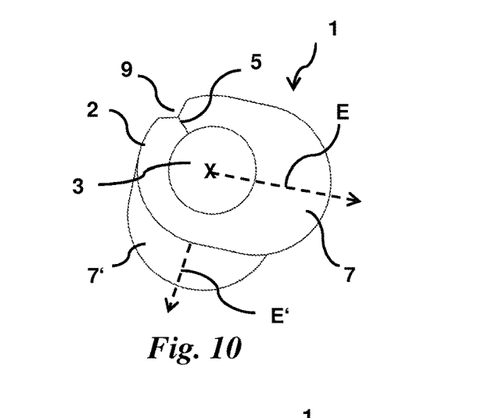
FIG. 10 shows a plan view of the vibration damper of FIG. 9 in the direction of the arrow X.

In the embodiment shown in FIGS. 9 and 10 the two eccentric portions 7, 7', the shape of which corresponds to that of the eccentric portion 7 in FIGS. 3 and 4, involve an axial spacing in the direction of the longitudinal axis 4, which spacing however is not absolutely necessary.

Conversely, in the embodiment in FIGS. 7 and 8, it is also possible to provide such an axial spacing in respect of the eccentric portions 6, 6'.

Figure 11:
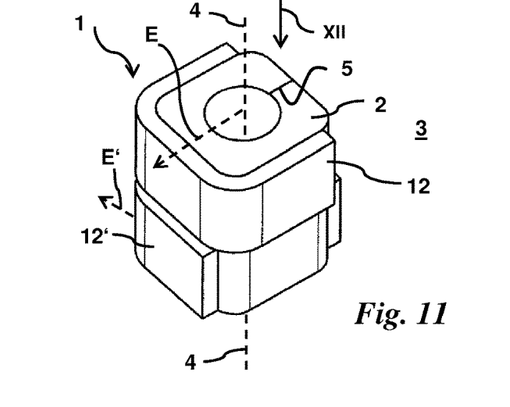
FIG. 11 shows a perspective view of a sixth embodiment of a vibration damper according to the invention with two fitted-on additional elements.
Figure 12:
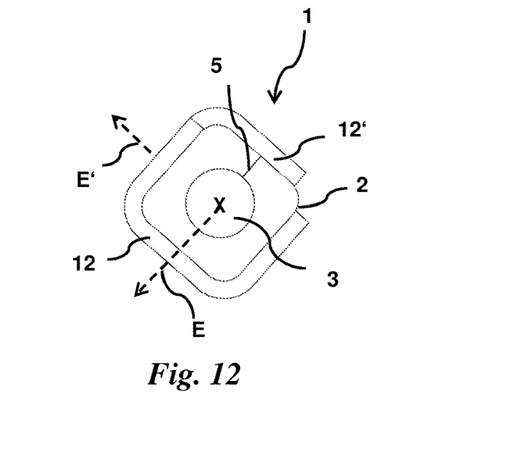
FIG. 12 shows a plan view of the vibration damper of FIG. 11 in the direction of the arrow XII.

The embodiment shown in FIGS. 11 and 12 approximately corresponds to that shown in FIGS. 5 and 6, but here the main body 2 is of such an axial length that it is possible to fit thereon two additional elements 12, 12', the eccentricity axes E, E' of which are also arranged turned through 90° relative to each other.

What is essential in all those embodiments is that the vibration dampers are mounted non-rotatably on the injection line pipe in question, which can be effected for example by being glued on. For that purpose a suitable layer of adhesive is provided between the inside surface of the respective hollow cylinder 2 and the outside of the injection line pipe (not shown).

As an alternative thereto however it is possible for the inside diameter of the inside hollow space 3 in the main body 2 to be selected to be so much smaller than the outside diameter of the injection line pipe to be damped, that the main body 2 is connected non-rotatably to the injection line pipe by virtue of its elasticity in frictionally locking engagement.

In principle it is also possible for more than two of the vibration dampers shown in FIGS. 1 through 6 to be fixed on one and the same injection line pipe, in which case the eccentricity axes are preferably rotated alternately through 90° relative to each other.

In a corresponding manner it is also possible for a plurality of the vibration dampers shown in FIGS. 7 through 12 to be non-rotatably mounted to one and the same injection line pipe.

Figure 13:
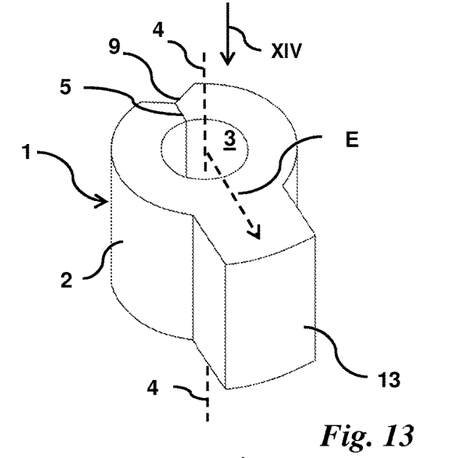
FIG. 13 shows a perspective view of a seventh embodiment of a vibration damper according to the invention with a cuboidal eccentric portion.
Figure 14:
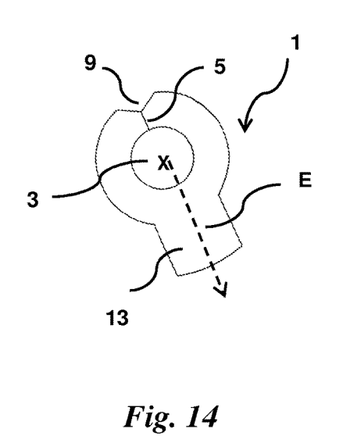
FIG. 14 shows a plan view of the vibration damper of FIG. 13 in the direction of the arrow XIV.

The vibration damper 1 shown in FIGS. 13 and 14 substantially corresponds to the embodiments of FIGS. 1 through 6, that is to say it has only one eccentric portion 13 which here is of a cuboidal shape, projects in the radial direction beyond the peripheral surface of the main body 2, and extends over the entire axial length thereof. Preferably at least two of that vibration damper are mounted non-rotatably on an injection line pipe to achieve a good vibration damping effect.

Figure 15:
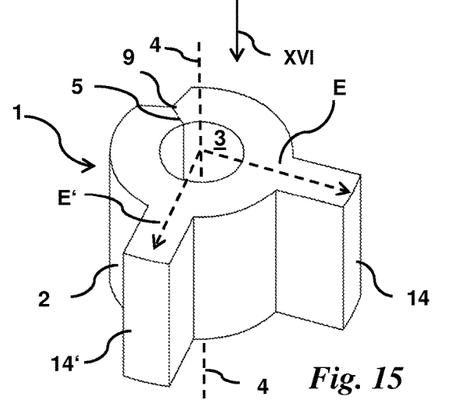
FIG. 15 shows a perspective view of a eighth embodiment of a vibration damper according to the invention with two cuboidal eccentric portions.
Figure 16:
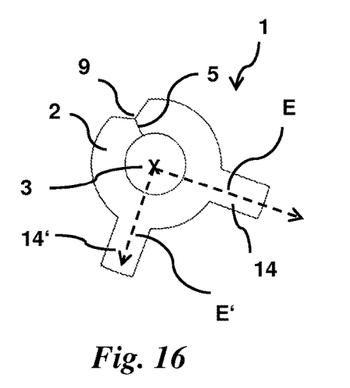
FIG. 16 shows a plan view of the vibration damper of FIG. 15 in the direction of the arrow XVI.

In the embodiment in FIGS. 15 and 16 the main body 2 carries two eccentric portions 14 and 14' which are of a similar configuration to the eccentric portion 13 in FIGS. 13 and 14 and which also extend over the entire axial length of the main body 2 and which are arranged centrally relative to two radial planes which include an angle of about 90° with each other. In this case it is sufficient for only a single such vibration damper 1 to be non-rotatably mounted on an injection line pipe to achieve the desired vibration damping effect. It is however also possible for a plurality of such vibration dampers 1 to be fixed to a single injection line pipe. The two specified radial planes can also include any other angle with each other, which however should be different from 180°. The extent of the two eccentric portions 14 and 14' in the radial direction (direction of the arrows E and E') can be the same or different.

Figure 17:
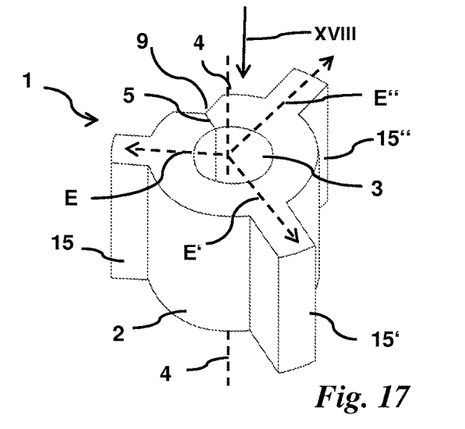
FIG. 17 shows a perspective view of a ninth embodiment of a vibration damper according to the invention with three cuboidal eccentric portions.
Figure 18:
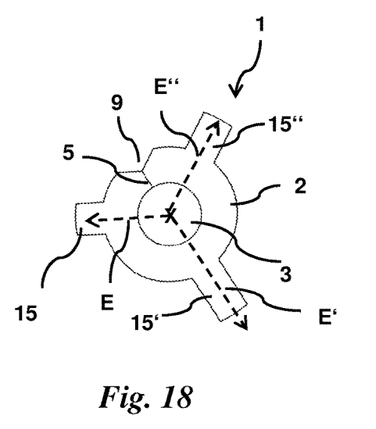
FIG. 18 shows a plan view of the vibration damper of FIG. 17 in the direction of the arrow XVIII.

In the embodiment shown in FIGS. 17 and 18 the main body 2 is connected to three eccentric portions 15, 15', 15", the radial planes of which respectively include an angle of 120° with each other. To here achieve eccentric mass distribution, it is provided that at least two and preferably all three eccentric portions 15, 15' and 15" extend by different amounts in the radial direction so that the line of the center of mass of that vibration damper 1 does not coincide with the longitudinal axis 4.

In the embodiments of FIGS. 13 through 18 the eccentric portion or portions can also be formed in one piece with the respective main body 2 or can be fixedly mounted thereto. They may comprise the same material or another material, from the respective main body 2.

The embodiments shown in FIGS. 19 through 25 differ from the above-described embodiments firstly in that here, provided on the inside wall, which in principle is in the form of a circular cylinder, of the inside hollow space 3 in the main bodies 2 there is a tooth arrangement 16 which extends radially towards the longitudinal axis 4 and which extends over the entire axial length of the main body 2 and which is formed by spline-shaped inwardly projecting projections which are arranged symmetrically relative to the longitudinal axis 4 and whose radial extent is of such a size that the inwardly disposed crests thereof in the assembled condition come into engagement with the outside wall of the injection line pipe (not shown) to be damped, in a condition of permitting non-rotational fixing.

This configuration has the advantage that the entire main body 2 can perform rotational vibrations about its longitudinal axis 4 which is coincident in the assembled condition with the longitudinal axis of the injection line pipe, which rotational vibrations also contribute to damping the vibrations of the injection line pipe.

Figure 21:
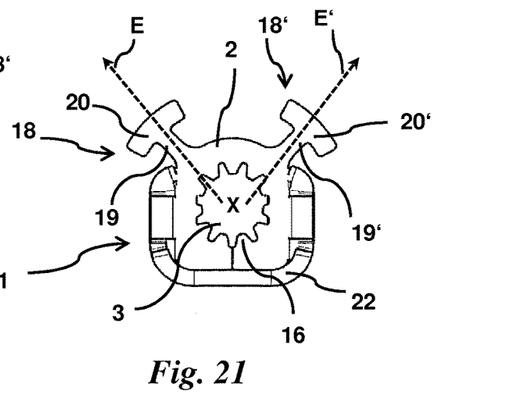
FIG. 21 shows a section through the vibration damper of FIG. 19 in a plane perpendicularly to its longitudinal axis with fitted fixing element.
Figures 24, 25:
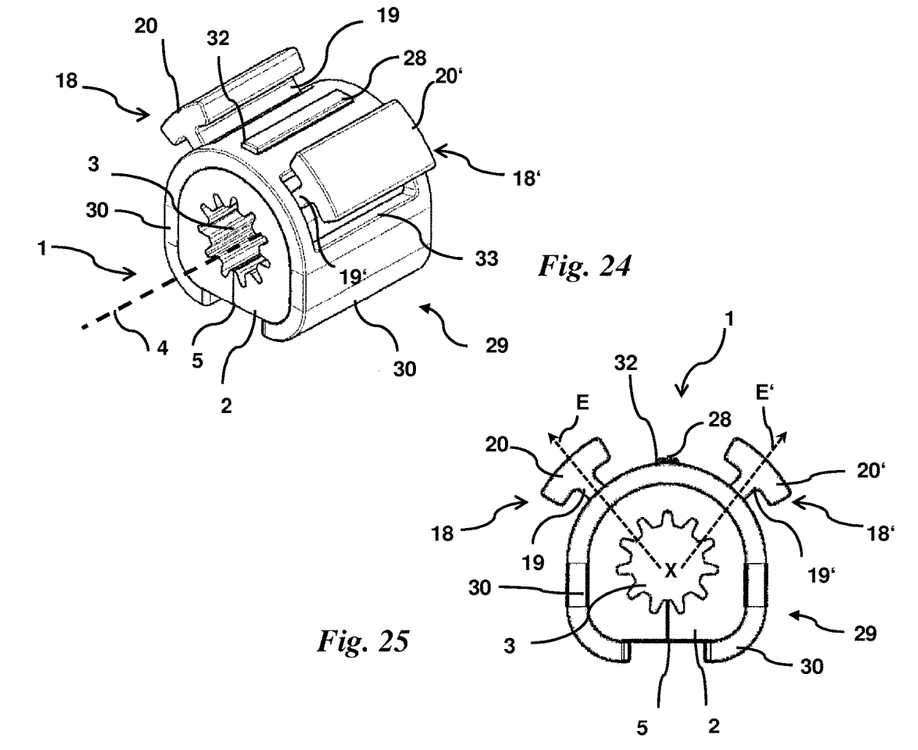
FIG. 24 shows a perspective view of the vibration damper of FIG. 23 in the finished fitted condition, the injection line pipe being omitted for the sake of clarity.
FIG. 25 shows a section through the vibration damper of FIG. 24 perpendicularly to its longitudinal axis.

In this case also provided on the one main body 2 which is of an approximately square cross-section are two eccentric portions 18, 18' comprising a leg 19, 19' extending along one of the longitudinal edges of the main body 2, and a flange portion 20, 20' which is arranged at the end face of those legs 19, 19', that is away from the main body 2. The two legs 19, 19' extend in the radial direction with respect to the longitudinal axis 4 of the main body 2 and their eccentricity axes E, E' include an angle of about 90° with each other, as shown in FIGS. 21 and 25. In those sectional views, each of the two eccentric portions 18, 18' is of an approximately T-shaped cross-section.

Figure 19:
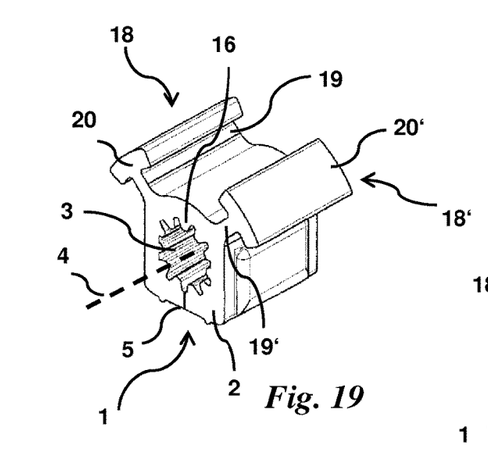
FIG. 19 shows a perspective view of a tenth embodiment of a vibration damper according to the invention with two eccentric portions of T-shaped cross-section.
Figure 22:
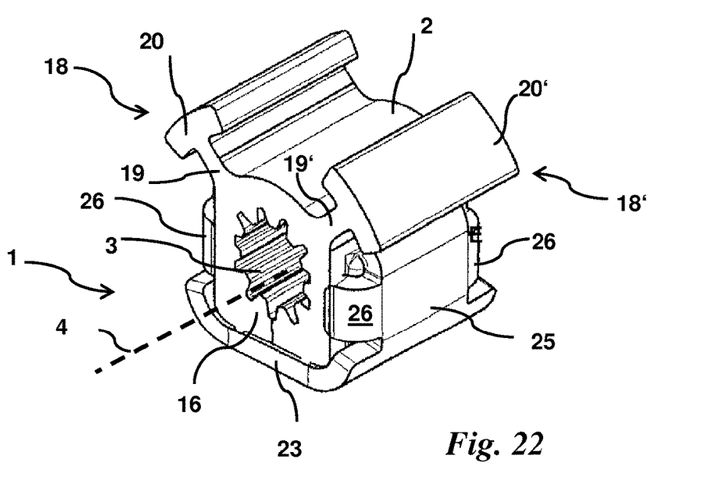
FIG. 22 shows a perspective view on an enlarged scale of the vibration damper of FIG. 19 with fitted fixing element.

As can be seen from FIGS. 19, 21 and 22, in this case also the main body 2 is provided along one of its surface lines 5, that is to say here approximately in the center of its lower outside surface, with a slot which extends over its entire axial length and which permits fitment thereof on the injection line pipe to be damped. The V-shaped notch 9 present in the embodiments shown in FIGS. 1 through 18 is not required here because, in the assembly procedure, the main body 2 can be gripped at the two eccentric portions 18, 18' whereupon they are pressed towards each other so that the angle included by their eccentricity axes E, E' is reduced and the gap at the oppositely disposed surface line 5 is opened. When then the injection line pipe is introduced into the inside hollow space 3 through that gap the two eccentric portions 18, 18' are released and the elastically deformed main body 2 reverts to its original shape so that the inwardly projecting tooth arrangement 16 is pressed against the outside wall of the injection line pipe for non-rotational engagement.

Figure 20:
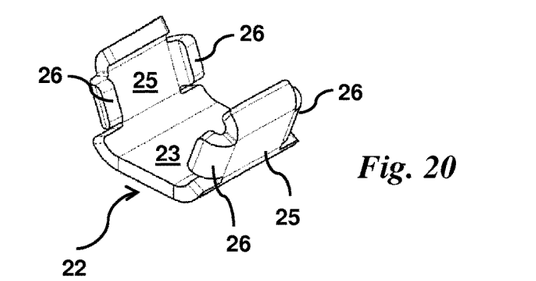
FIG. 20 shows a perspective view of a fixing element belonging to the vibration damper of FIG. 19.

The non-rotational fixing of the connection produced in that way between the main body and the injection line pipe can be enhanced by the provision of a plastically deformable fixing element 22 which is shown separately in FIG. 20 and which comprises for example metal and which, as shown in FIGS. 21 and 22, is squeezed on to the main body 2, encloses it at least from three sides here in a C-shaped configuration, and compresses it.

To permit that the fixing element 22 has a bottom plate 23 which is slightly concave towards the main body 2 and which is adapted in its shape to the outside contour of the underside of the main body 2 and from the longitudinal edges of which a respective integrally formed tongue 25 projects upwardly in such a way that the upper edges of the tongues 25, 25, that are remote from the bottom plate 23, are at a greater spacing than their lower edges which are connected to the bottom plate 23. In that way, in the assembly procedure, the fixing element 22 can be easily fitted from below to the main body 2 of the vibration damper 1, which main body is fitted on to the injection line pipe to be damped, whereupon then the two tongues 25, 25 are pressed together with plastic deformation of the fixing element 22 in order to come to bear against the side surfaces of the main body 2 and to press the tooth arrangement 16 at the inside wall of its inside hollow space 3 against the outside wall of the injection line pipe.

To ensure a permanent connection between the main body 2 of the vibration damper 1 and the fixing element 22 each of the two tongues 25, 25, at each of its side edges, has a small projection 26, 26 which, upon fitment of the fixing element 22 on the main body 2, can be bent over towards the axially directed end faces thereof so that the main body 2 is enclosed between those projections 26.

The upper edge of each tongue 25 is bent over somewhat inwardly so that, when the tongues 25, 25 are pressed together during assembly of the fixing element 22 to the main body 2, the upper edge of each tongue 25 is pressed into the material of the main body 2 and thus contributes to its compression and providing a secure connection between main body 2 and fixing element 22.

The fixing element 22 forms a third eccentric portion which is diametrically opposite the two eccentric portions integrally formed on the main body 2, and further improves the damping characteristics of the vibration damper.

Figure 23:
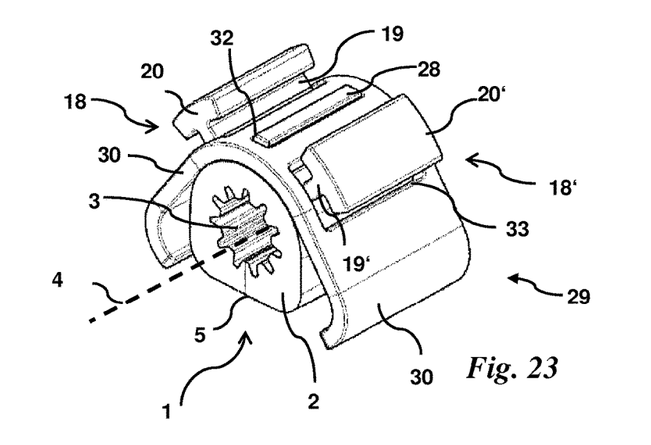
FIG. 23 shows a perspective view of an eleventh embodiment of a vibration damper according to the invention with two eccentric portions of T-shaped cross-section and a pre-fitted fixing element.

The main body 2 of the embodiment shown in FIGS. 23 through 25 is of substantially the same shape as the main body 2 shown in FIGS. 19, 21 and 22, with the exception that its outside wall disposed between the two eccentric portions 18, 18' is somewhat more greatly curved convexly outwardly.

At its apex disposed in the center between the two eccentric portions 18, 18' that outside wall carries a radially upwardly projecting rib 23 extending only over a part of the axial length of the main body 2.

The eccentric portions 18, 18' are of precisely the same structure and arrangement as in the preceding embodiment so that there is no need for a fresh description thereof here. In this case also, no V-shaped notch is required in the region of the slot extending along the surface line 5 as mounting of the main body 2 on an injection line pipe can also be effected by the two eccentric portions 18, 18' being pressed towards each other.

As can be seen in particular from FIG. 23 in this embodiment a C-shaped fixing element 29 which comprises a plastically deformable material, in particular metal, is of such a configuration that, for a pre-fitment process, it can be fitted on to the main body 2 from above, that is to say from the side opposite to the slotted surface line 5. In that case its two limbs 30, 30 are spread apart to such an extent that the main body 2 can be easily introduced between them. At the apex of its C-shape the fixing element 29 has an opening 32 which is of such dimensions that the rib 28 of the main body 2 can pass through it in the pre-fitment procedure. In addition, provided in the fixing element 29 are two window openings 33, 33 which pass therethrough and which are disposed symmetrically relative to its apex and which in that process permit the flange portions 20, 20' of the two eccentric portions 18, 18' to pass through.

In that way the main body 2 and the fixing element 29 can be assembled in a particularly advantageous fashion to provide a pre-fitted structural unit which can be fitted in the above-described manner on an injection line pipe to be damped and can then be non-rotatably mounted in place by plastic deformation, that is to say by pressing the spread limbs 30, 30 of the fixing element 29 together. Because the fixing element 29 can be pre-fitted on the main body 2 it is possible to achieve a considerable time saving in final fitment of the vibration damper on the respective injection line pipe.

In this case also the fixing element 29 forms a third eccentric portion, by which the damping characteristics of the vibration damper can be further improved.

The invention claimed is:

1. A vibration damper configured to operate in accordance with the mass-spring principle includes a main body which
   consists of an elastomeric vibration-damping material,
   has an inside hollow space which passes therethrough in a longitudinal direction,
   has a slot extending along a surface line over the entire axial length of the main body, and
   can be spread open along said surface line to be non-rotatably fitted on an injection line pipe such that said main body surrounds the injection line pipe and that the longitudinal axis of the inside hollow space coincides with the longitudinal axis of the injection line pipe, and is characterised
   in that on the outside of said main body on a side which with respect to said longitudinal axis of the inside hollow space is opposite to said surface line along which said slot extends exactly two eccentricity portions of a same shape are provided, each of them having an eccentricity axis which extends with respect to the longitudinal axis of the inside hollow space of said main body in a radial direction through the center of mass of the respective eccentricity portion,
   in that said eccentricity axes includes with respect to each other an angle which is greater than 0° and less than 180°,
   whereby a mass distribution eccentric with respect to the longitudinal axis of the inside hollow space of said main body is imparted in the vibration damper, and
   in a final assembled configuration, the vibration damper is in contact exclusively with the injection line pipe.

2. The vibration damper as set forth in claim 1 characterised in that the inside hollow space extending through the main body is of a circular-cylindrical cross-section, the diameter of which is matched to the outside diameter of the injection line pipe for an engagement which is non-rotatable in the fitted condition.

3. The vibration damper as set forth in claim 2 characterised in that the inside hollow space extending through the main body has a roughened wall.

4. The vibration damper as set forth in claim 1 characterised in that the inside hollow space extending through the main body is of a circular-cylindrical cross-section whose diameter is larger than the outside diameter of the injection line pipe on which the vibration damper is to be fitted and that an inside wall of the main body has a radially inwardly projecting tooth arrangement whose radial extent is such that in the fitted condition with its inwardly disposed ends it is in non-rotatable engagement with an outside wall of the injection line pipe.

5. The vibration damper as set forth in claim 4 characterised in that the angle included by the two eccentricity axes is 90°.

6. The vibration damper as set forth in claim 4 characterised in that the main body is of an approximately square outside cross-section and that each of the two eccentricity portions includes a leg which extends along one of the longitudinal edges of the main body and which is integrally connected thereto and which is symmetrical relative to the respective eccentricity axis and which at its outside edge remote from the main body carries a plate-shaped flange portion which is enlarged with respect to a thickness of the leg and which is also symmetrical relative to the eccentricity axis.

7. The vibration damper as set forth in claim 1 characterised in that the vibration damper further comprises an additional element which can be non-rotatably connected to the main body.

8. The vibration damper as set forth in claim 7 characterised in that the main body and the additional element are made of different materials of different density.

9. The vibration damper as set forth in claim 8 characterised in that the main body is of an approximately square outside contour and that the additional element has a cross-section which is matched thereto and which is open at one side and in the fitted condition is mounted with elastic deformation on the main body in such a way that the additional element embraces the main body on at least three sides.

10. The vibration damper as set forth in claim 1 characterised in that the vibration damper further comprises a fixing element which in the fitted condition with plastic deformation is squeezed on to the main body in such a way that the fixing element embraces the main body on at least three sides.

11. The vibration damper as set forth in claim 10 characterised in that the fixing element acts as a third eccentric portion and consist of metal.

12. An injection line system for a diesel engine characterised in that the injection line system includes at least one injection line pipe and at least one vibration damper as set forth in claim 1 and fitted on said at least one injection line pipe.

13. The vibration damper as set forth in claim 1 characterised in that said two eccentricity portions and said main body are integrally connected.

* * * * *